United States Patent Office 3,387,920
Patented June 11, 1968

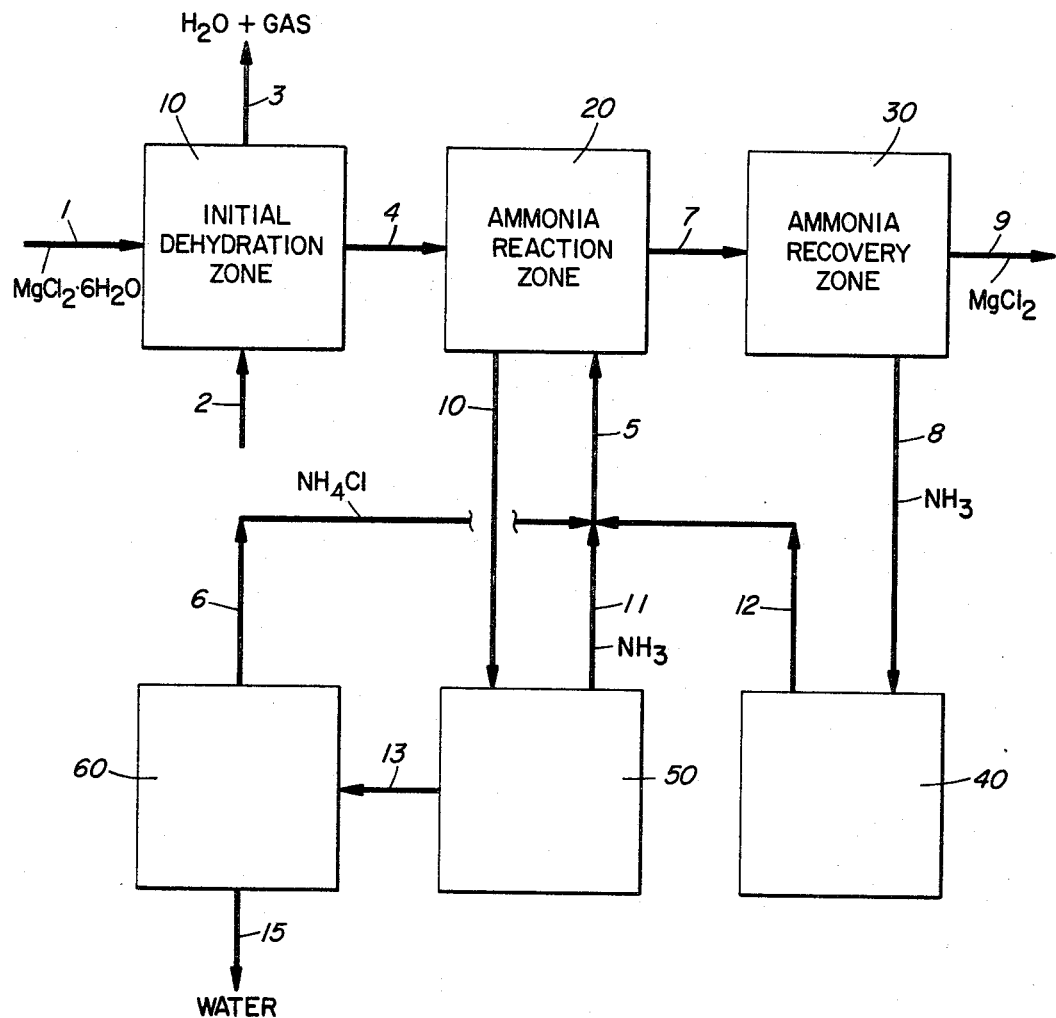

3,387,920
DEHYDRATION OF MAGNESIUM CHLORIDE UTILIZING TWO STAGES
Eugene Richard Nightingale, Jr., Murray Hill, N.J., assignor to Esso Research and Engineering Company, a corporation of Delaware
Filed July 14, 1965, Ser. No. 471,977
8 Claims. (Cl. 23—91)

ABSTRACT OF THE DISCLOSURE

The present invention is concerned with an improved process for the dehydration of hydrous magnesium chloride containing about 6 molecules of water by utitlizing a staged process, wherein in a first stage about 2–4 molecules of water are removed. By operating in this manner, the amount of magnesium oxide in the final product is drastically reduced.

---

The present invention is broadly concerned with the purification and dehydration of magnesium chloride so as to produce anhydrous magnesium chloride which may be further processed as, for example, by means of an electrolytic cell. The invention is specifically concerned with a technique for the dehydration of magnesium chloride utilizing a plurality of integrated processing zones wherein the last traces of water are removed by the use of ammonia and wherein a relatively small quantity of undesirable magnesium oxide is produced. The magnesium chloride hexammoniate product, substantially completely free of magnesium oxide, is then processed in a manner so as to produce anhydrous magnesium chloride and to regenerate the ammonia for recycling to the system.

It is known in the art that naturally occurring magnesium chloride, ores or brines, generally contains associated therewith about six molecules of water of hydration ($MgCl \cdot 6H_2O$). It is also known in the art that by general dehydration processes it is possible to remove about four molecules of water without securing undesirable side reactions. However, if further dehydration is continued by known techniques in order to remove the remaining two molecules of water, undesirable side reactions occur such as the formation of magnesium hydroxy chloride, magnesium oxide and hydrochloric acid. This is very undesirable, particularly if the magnesium chloride is to be further processed by electrolysis.

It has now been discovered that, if a plurality of interrelated stages or reaction zones are employed which utilizes the technique of treating the magnesium chloride prior to contacting with ammonia to remove about 2 molecules of water and then replacing the last traces of moisture with ammonia, unexpected desirable results are secured. U.S. Patetnt 3,092,450 issued June 4, 1963, entitled "Preparation of Anhydrous Magnesium Chloride," inventor Christensen et al. points out that if anhydrous magnesium chloride is prepared using ammonia, it is essential that the percent of ammonia in the reactor be in the range of from 35–65% by weight. More specifically, this patent teaches that if the ammonia concentration is greater than 65% by weight the magnesium oxide in the product is in excess of 0.5% by weight which is a prohibitive amount. In accordance with the present invention, it is discovered that by removing the water of hydration in stages, a very high quality magnesium chloride product is secured even when using ammonia solutions having a weight concentration in the range from about 70–95%.

The present invention may be more fully understood by reference to the drawing illustrating one embodiment of the same. Referring specifically to the drawing, magnesium chloride as mined is processed by conventional technology to separate out the undesirable insolubles such as gangue, mud, slime, etc. After the gangue and impurities are removed the magnesium chloride ore or brine is treated by conventional means in order to substantially completely remove all free water.

In accordance with the present invention, the magnesium chloride containing very little free water as for example, magnesium chloride hexahydrate ($MgCl_2 \cdot 6H_2O$), is introduced into initial dehydration zone 10 by means of line 1. Although a kiln may be utilized, it is prefered that dehydration zone 10 be of a conventional fluid bed design in which the fluidizing gas is introduced by means of line 2 and removed overhead by means of line 3 along with water vapor. The water removed overhead by means of line 3 comprises the free water and also some water of hydration. The dehydration gas or fluidizing gas may be any inert gas such as nitrogen, hot air or combustion gas. It is preferred that the fluidizing gas comprise hot air or combustion gas. The temperature maintained in initial dehydration zone 10 by conventional means is in the range from about 105° C. to about 250° C., preferably about 150° C. It is also preferred that temperature and time conditions in zone 10 be adjusted so that about 4 to 4.2 molecules of water of hydration be associated with the magnesium chloride removed from initial dehydration zone 10 by means of line 4.

The partially dehydrated magnesium chloride containing about 4.0 molecules of water of hydration which is removed from dehydration zone 10 by means of line 4 is introduced into an initial or ammonia reaction zone 20. An aqueous solution of liquid ammonia containing more than about 70% by weight of ammonia, preferably from about 80% to 90% by weight of ammonia is introduced into initial reaction zone 20 by means of line 5. A desired adaptation is to also introduce ammonium chloride or another soluble ammonium salt into reaction zone 20 by means of line 6 in which the ammonium chloride is dissolved in the liquid ammonia stream. The ammonium chloride in reaction zone 20 is at a concentration in the range from about 0.5 to 10% by weight, preferably about 2 to 5% by weight.

The temperature maintained in initial reaction zone 20 is in the range from about 15° to 95° C., preferably at a temperature of about 60° C. The pressure in reaction zone 20 is maintained in the range from about 100 to 800 lbs., preferably at a pressure of about 350 lbs. Under these conditions the water in the magnesium chloride is replaced to form magnesium chloride hexammoniate ($Mg(NH_3)_6Cl_2$). The other products are ammonium chloride and water which are dissolved in the liquid ammonia. By contacting partially dehydrated magnesium chloride in initial reaction zone 20 with an aqueous ammonia solution of a concentration in the range from about 75–90% by weight, very little undesirable magnesium oxide is formed. The amount of magnesium oxide formed is below 0.5 weight percent and generally in the range from about 0.05 to 0.3% by weight based upon the amount of magnesium chloride formed.

The magnesium chloride hexammoniate $$(Mg(NH_3)_6Cl_2)$$

substantially completely free of magnesium oxide, is withdrawn from reaction zone 20 by means of line 7 and introduced into a decomposition chamber or secondary reaction zone 30. The temperature and pressure conditions are adjusted in secondary reaction zone 30 to separate the ammonia which is removed by means of line 8 and to produce anhydrous magnesium chloride ($MgCl_2$) which is removed by means of line 9. The ammonia removed from zone 30 by means of line 8 is passed to ammonia condensing zone 40 and then preferably recycled to the system by means of line 12. The temperature in secondary reaction zone 30 is maintained in the range from about 270° to 550° C., preferably about 400° C., while the pressure is in the range from 0.1 to 30 atmospheres, preferably from about 1 to 20 atmospheres, such as about 5 atmospheres.

The magnesium chloride withdrawn from zone 30 by means of line 9 is further processed, preferably by means of an electrolytic cell. Composition of product produced in the manner described from a 33% magnesium chloride brine containing about 1% by weight of potassium chloride and about 1% by weight of sodium chloride is about 99.8% by weight anhydrous magnesium chloride, 0.01% by weight potassium chloride, 0.01% by weight sodium chloride and 0.2% by weight magnesium oxide.

Liquid ammonia containing dissolved therein water and ammonium chloride, is withdrawn from reaction zone 20 by means of line 10 and passed into an ammonia recovery zone 50. Zone 50 is maintained at a temperature in the range from about 25 to 100° C., preferably at about 75° C. The pressure in zone 50 is in the range from about 140 to 800 lbs., preferably about 350 lbs. per sq. in. gauge. Under these conditions, ammonia is removed by means of line 11 and combined with the ammonia removed by means of line 12. An aqueous layer containing ammonium chloride is removed from zone 50 by means of line 13 and passed into an ammonium chloride recovery zone 60. Temperature and pressure conditions in zone 60 are adapted to remove ammonium chloride which is recycled to the system by means of line 14 and a water phase which is removed by means of line 15 and discarded. Temperature in zone 60 is maintained in the range from about 75° to 300° C., preferably at about 200° C. The pressure maintained in zone 60 is in the range from about 0.1–5 atmospheres, preferably about 1 atmosphere.

In order to further illustrate the invention, a number of operations were conducted wherein all conditions were maintained substantially the same except that in two operations, a portion of the water of hydration was removed prior to introducing the magnesium chloride into the ammonia reactor. The results of these operations are tabulated in the following table.

dehydration zone mixing the partially dehydrated magnesium chloride with a solution of liquid ammona, said solution containing from about 70 to 95% by weight of ammonia under conditions wherein the magnesium chloride reacts with ammonia to form a precipitate of magnesium chloride hexammoniate, separating the precipitated magnesium chloride hexammoniate from the reaction mixture, and recovering anhydrous magnesium chloride from the magnesium hexammoniate.

2. Process as defined by claim 1 wherein the concentration of the ammonia in the solution is in the range from about 80 to 95% by weight.

3. Process as defined by claim 1 wherein said magnesium chloride hexammoniate precipitate is passed to an ammonia recovery zone maintained under temperature and pressure conditions adapted to remove ammonia which is recycled to the system and also produce anhydrous magnesium chloride containing less than about 0.3% by weight of magnesium oxide.

4. Process as defined by claim 1 wherein the temperature in the secondary dehydration zone is in the range from about 15 to 95° C.

5. Process as defined by claim 1 wherein the temperature in the initial dehydration zone is in the range from about 105° C. to 250° C., and wherein the temperature in the secondary dehydration zone is in the range of about 15° C. to 95° C.

6. Process as defined by claim 1 wherein said anhydrous magnesium chloride is recovered by passing the magnesium chloride hexammoniate into an ammonia recovery zone wherein the temperature is maintained in the range from about 250 to 550° C. and wherein the pressure is in the range from about 0.1 to 30 atmospheres.

7. Process as defined by claim 1 wherein the temperature in the secondary dehydration zone is in the range from about 15 to 95° C. and wherein the pressure is in the range from about 100 to 800 lbs. per square inch gauge.

8. Process as defined by claim 1 wherein about 0.5 to 10% by weight of ammonium chloride is added to said secondary dehydration zone.

| Operation | A | B | C |
|---|---|---|---|
| | Without dehydration prior to $NH_3$ treat | With partial dehydration prior to $NH_3$ treat | |
| Composition of original feed | $MgCl_2 \cdot 6H_2O$ | $MgCl_2 \cdot 6H_2O$ | $MgCl_2 \cdot 6H_2O$. |
| Composition of feed to $NH_3$ reactor | $MgCl_2 \cdot 6H_2O$ | $MgCl_2 \cdot 3.9H_2O$ | $MgCl_2 \cdot 2.1H_2O$. |
| Amount of liquid $NH_3$ in reactor | 89.5% by wt | 83.9% by wt | 86.4% by wt. |
| T of reactor | 135° F | 120° F | 120° F. |
| P of reactor | 300–375 p.s.i. | Pressures sufficient to liquefy $NH_3$ as for instance in the range | |
| Time of reaction | 65 min | 40 min | 60 min. |
| Amount of MgO in $MgCl_2$ product | 3.79% by wt | Less than 0.1% by wt | 0.16% by wt. |

It is apparent from the above that unexpected desirable results are secured when removing from about 2 to 4 molecules of water of hydration prior to introducing the magnesium chloride into the ammonia reactor. The amount of undesirable magnesium oxide produced was less than about 0.2% by weight.

What is claimed is:

1. Process for the preparation of anhydrous magnesium chloride containing less than about 0.5% by weight of magnesium oxide from a hydrous feed magnesium chloride containing about 6 molecules of water which comprises removing about 2–4 molecules of the water of hydration in an initial dehydration zone, thereafter in a secondary

References Cited

UNITED STATES PATENTS

| 1,871,428 | 8/1932 | Smith | 23—91 |
| 3,092,450 | 6/1963 | Christensen et al. | 23—91 |

FOREIGN PATENTS

| 282,164 | 2/1931 | Italy. |

OTHER REFERENCES

Journ. Indian Chem. Soc., Ind. and News Ed., volume 14, No. 3, and 4 1951 (article by B. B. Bose et al.)

OSCAR R. VERTIZ, Primary Examiner.

EDWARD STERN, Examiner.